3,294,641
ACCELERATING THE LYSIS OF BLOOD CLOTS
Laszlo Lorand, Evanston, Ill., assignor to Northwestern University, Evanston, Ill., a corporation of Illinois
No Drawing. Filed May 20, 1963, Ser. No. 281,796
10 Claims. (Cl. 167—73)

This invention relates to novel compositions of matter involving the combination of urokinase and a glycine derivative and to a method employing such compositions in order to accelerate the lysis of blood clots.

Urokinase is a complex protein of unknown structure which is found in human urine in trace amounts. It is an effective, blood clot lysing agent when injected in amounts far greater than those which exist naturally in urine. Methods of recovering urokinase from human urine are already known. However, the dissolution of a blood clot with this agent is not only slow but extremely expensive. It was thus deemed necessary to find agents which could be employed in conjunction with urokinase in order to speed up the lysing process and reduce the amount of urokinase required to dissolve a blood clot.

It is an object of the present invention to provide novel compositions of matter which when brought into contact with a vertebrate blood clot will materially accelerate the lysis of such clot as compared to the use of urokinase alone for this purpose.

Another object of this invention is to provide a method employing the novel compositions of matter herein disclosed which will decrease the cost and time of dissolving a blood clot.

This invention is predicated upon the discovery that the lysis of a blood clot can be accelerated in the presence of urokinase and certain glycine derivatives as compared to the use of urokinase alone. In my copending application filed concurrently herewith, there is described a method of inhibiting the crosslinking of fibrin by contacting vertebrate blood with glycine methyl ester, glycineamide or glycylglycine methyl ester. These compounds interfere with the final stage of blood clotting and prevent the polymerization of fibrin gel into a clot which is insoluble in 30% aqueous urea or 1% aqueous monochloroacetic acid. In other words, these glycine derivatives soften the blood clot and make it easier for urokinase to act thereon and promote lysing of the clot in a much shorter period of time. Furthermore, it has been found that much less urokinase is required to promote dissolution of a blood clot when employed in combination with one of these glycine compounds. The dramatic effect obtained by the disclosed combination can be demonstrated both in vitro and in vivo.

The exact amount of fibrin crosslinking inhibitor employed per unit of urokinase is not critical but good results are obtained when at least 10 micrograms or more of one of the glycine derivatives is employed per unit of urokinase activity. Equally effective results have been observed with as much as 1000 micrograms of glycine methyl ester per unit of urokinase. The combination can be employed per se or the blood clot can be treated first with one of the glycine derivatives and then with a urokinase solution.

The invention is more clearly understood by reference to the following examples which set forth the best mode contemplated for carrying out the same and are to be construed as illustrative rather than restrictive.

*Example 1*

Freshly drawn human blood (0.8 ml.) was mixed in separate test tubes (a) with 0.1 ml. of 0.2 molar aqueous glycineamide and 0.1 ml. of a urokinase solution containing 90 units of activity in 0.15 molar aqueous sodium chloride and (b) with 0.1 ml. of 0.2 molar aqueous sodium chloride and 0.1 ml. of the same urokinase solution containing 90 units of activity. Clotting occurred in both samples within 7 minutes after the blood was drawn. The samples were then incubated at 37° C. and lysis was judged at periodic intervals by visual disappearance of the clots. It was found that the clots in the sample containing both urokinase and glycineamide were completely dissolved after only one hour of incubation. In sharp contrast, the sample containing urokinase only still had undissolved clot residues after 18 hours of incubation. Similar results are obtained with the blood of rabbits and rats when glycineamide, glycine methyl ester or glycylglycine methyl ester is employed in a concentration of about 16 micrograms or more per unit of urokinase activity.

*Example 2*

In another test, one ml. of fresh human blood was mixed with 0.1 ml. of 0.05 molar aqueous tris(hydroxymethyl)aminomethane buffer solution adjusted to a pH of 7.4 and 0.1 ml. of a urokinase solution containing 53 units of activity in the same tris buffer solution and allowed to clot. Another one ml. sample was mixed with 0.1 ml. of a 60 millimolar solution of glycine methyl ester in the tris buffer solution previously prepared plus 0.1 ml. of the same urokinase solution and allowed to clot. Both samples were incubated at 37° C. and carefully observed for lysis of the blood clots. The sample containing the urokinase solution only required more than 3 hours for complete dissolution of the clot whereas the sample containing both urokinase and glycine methyl ester required only 30 minutes for lysis to occur. The concentration of the ester in this test was 10 micrograms per unit of urokinase activity.

*Example 3*

A one ml. sample of blood was obtained from a dog and added to 0.1 ml. of a 0.05 molar aqueous tris(hydroxymethyl)aminomethane solution adjusted to a pH of 7.4 and 0.1 ml. of a urokinase solution in the same tris buffer solution containing 215 units of activity. The dog was then administered an intravenous dose of 375 mg./kg. of a 40% aqueous solution of glycine methyl ester hydrochloride adjusted to a pH of 7. Five minutes later, a one ml. sample of blood was withdrawn and added to 0.1 ml. each of the same tris buffer solution and urokinase solution previously prepared. Both samples were allowed to clot and thereafter incubated at 37° C. for 7 hours with shaking and carefully observed for lysis of the clots. It was found that the clot in the sample containing both urokinase and glycine methyl ester was 50% smaller than the clot in the sample containing urokinase only.

*Example 4*

Two one ml. samples of fresh human blood was added to 0.2 ml. of 0.05 molar aqueous tris(hydroxymethyl)-aminomethane solution adjusted to a pH of 7.4 and allowed to clot. To one clotted sample was added 0.1 ml. of a urokinase solution in the same tris buffer solution containing 66 units of activity. To the other clotted sample was added 0.1 ml. of a 60 millimolar solution of glycine methyl ester in the tris buffer solution first prepared and 0.1 ml. of the urokinase solution previously prepared. Both samples were then incubated at 37° C. and observed for lysis of the blood clot. The clot in the sample containing both glycine methyl ester and urokinase completely dissolved in less than 24 hours whereas the clot in the sample containing urokinase alone was only partially dissolved after 24 hours of incubation.

A unit of urokinase activity as herein employed defines its ability to activate the plasminogen in a preformed fibrin clot which eventually results in the dissolution of said clot. The procedure for determining such activity is based upon a modification of Fletcher's clot dissolution method described in Biochem, Journal, 56, 677 (1954). Briefly, various amounts of urokinase are added to test tubes containing one milliliter of a 1.6% fibrinogen solution obtained from bovine fraction 1 in a 1.03% sodium barbital buffer. Fibrin clots are then formed by the addition of thrombin and the tubes are incubated at 37° C. for 17 hours during which time clot lysis occurs. The amount of urokinase resulting in 50% lysis is estimated and compared to a standard assigned an arbitrary unit of activity. By parallel assay, one unit of urokinase activity as referred to in this specification is the equivalent of 0.5 unit described in U.S. Patent 2,983,647.

I claim:

1. A method of accelerating the lysis of a vertebrate blood clot which comprises contacting said clot with a composition consisting essentially of urokinase and a fibrin crosslinking inhibitor selected from the group consisting of glycine methyl ester, glycineamide and glycylglycine methyl ester.

2. A method as claimed in claim 1 in which the amount of inhibitor employed is at least 10 micrograms per unit of urokinase activity.

3. A method as claimed in claim 2 in which the inhibitor employed is glycine methyl ester.

4. A method as claimed in claim 2 in which the inhibitor employed is glycineamide.

5. A method as claimed in claim 2 in which the inhibitor employed is glycylglycine methyl ester.

6. A composition for accelerating the lysis of a vertebrate blood clot consisting of a buffered aqueous solution of urokinase and a glycine derivative selected from the group consisting of glycine methyl ester, glycineamide and glycylglycine methyl ester.

7. A composition as claimed in claim 6 which contains at least 10 micrograms of the glycine derivative per unit of urokinase activity.

8. A composition as claimed in claim 7 in which the glycine derivative is glycine methyl ester.

9. A composition as claimed in claim 7 in which the glycine derivative is glycineamide.

10. A composition as claimed in claim 7 in which the glycine derivative is glycylglycine methyl ester.

References Cited by the Examiner

Newcomb: The New England Journal of Medicine, vol. 260, No. 11, pp. 545–548, March 1959, 167–65.5A.

Shapiro: Scientific American, vol. 84, pp. 18–21, March 1951.

JULIAN S. LEVITT, *Primary Examiner.*

L. B. RANDALL, *Assistant Examiner.*